Patented July 6, 1943

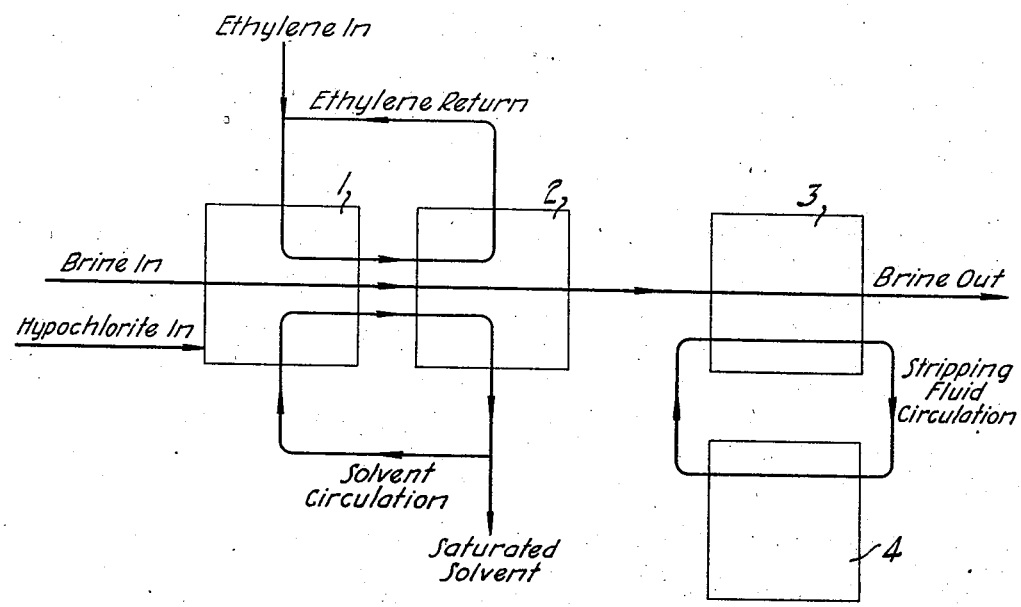
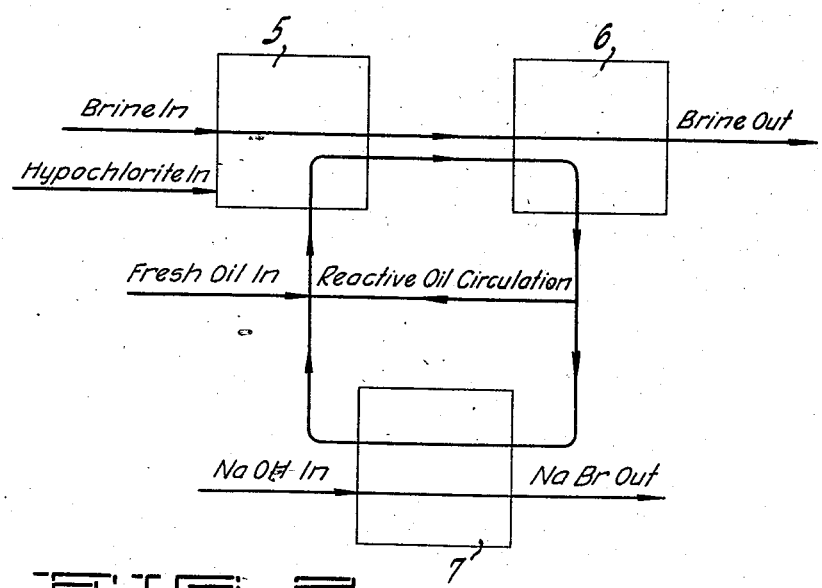

2,323,549

UNITED STATES PATENT OFFICE 2,323,549

BROMINE EXTRACTION PROCESS

Frank F. Lindstaedt and David L. Shatto, San Francisco, Calif.

Application May 14, 1938, Serial No. 208,084

7 Claims. (Cl. 23—217)

The invention relates to processes for extracting bromine and halogens from saline brines.

Bromine has been heretofore recovered from sea-water, bittern, mother-liquors, etc. by first liberating the bromine in the brine and thereafter concentrating the liberated bromine in various ways. The chief source of bromine has heretofore been from sea-water and natural salt beds and brines, and the bromine content of these sources is generally relatively small. For example in sea-water, one of the principal sources of bromine recovery, the bromine content is in the order of only sixty to seventy parts per million of sea-water. To provide a commercial process therefor for extracting the bromine, it is necessary that a relatively high percentage recovery be obtained and that the costs of the ingredients used and the costs of the plant operations be kept to a minimum. The step of liberating the bromine from the sea-water or other brine has heretofore involved the step of acidifying the brine and then oxidizing the bromide ion, which is contained in the brine, in an acid solution, so as to convert the bromide ion into bromine without incurring certain undesirable side reactions. Chlorine has been generally used for oxidizing the bromine and in an acid solution of pH approximately 3 to 4 according to the following reaction:

$$2Br^- + Cl_2 = 2Cl^- + Br_2$$

Generally the sea-water or brine is acidulated by sulphuric acid; and chlorine gas, either by itself or together with air, is blown through the brine to oxidize the bromide ion. In instances where the sea-water or brine is of relatively low alkalinity, it is possible to successfully acidulate the brine by the use of an excess amount of chlorine and a successful extraction of bromine is obtained where the chlorine is added at a sufficiently high rate to acidulate the brine prior to the occurrence of side reactions and notably the formation of bromate. The acidulating action of the chlorine in the brine may be expressed by the following equation:

$$Cl_2 + 2NaOH = NaCl + NaClO + H_2O$$
$$Cl_2 + H_2O = HCl + HClO$$

On the other hand, in an alkali solution the above reaction is accompanied by the oxidation of the bromide ion to bromate, which may be represented by the following equation:

$$Br^- + 3Cl_2 + 6OH^- = BrO_3^- + 6Cl^- + 3H_2O$$

The formation of bromate in previous processes has substantially lowered the recovery of the bromine for the reason that no method has been devised heretofore for the recovery of bromine once the bromide ion has passed to bromate, for the reason that bromate is soluble in the brine and cannot be removed by ordinary methods of extraction with air or solvents, and due to other reagents in the brine, cannot be reacted with under methods and compounds heretofore used.

For the above reasons all commercial processes for the extraction of bromine which have been heretofore devised, have contemplated the acidulation of the brine and the liberation of the bromine in an acid solution. For example, the Ethyl Gasoline Corporation, I. E. Chem. 21, 434 (1929), used aniline in acidulated sea-water which formed an insoluble bromine compound, tribromoaniline, $C_6H_2Br_3NH_2$. As stated in the above reference, acidulation is necessary to prevent hydrolysis of the bromide ion. The Dow Chemical Company, in I. E. Chem. 26, 361 (1934), have described the method of extracting bromine from brine wherein chlorine and air are blown through acidulated sea-water to oxidize and liberate the bromine and the bromine is subsequently removed from the air by the use of a sodium carbonate solution. The above reference states:

"It was realized that an addition of acid as well as chlorine would be necessary in order to obtain a satisfactory yield of bromine from sea-water on account of its alkalinity, as indicated by its pH of 7.2. Otherwise, when the solution was chlorinated, neutralization would have been effected at the expense of the liberated bromine. At the same time there would have been a corresponding formation of oxidized bromine products from which bromine could not easily have been liberated again by chlorine. However, it was found that even in carefully neutralized sea water, a satisfactory yield of bromine was not obtained. An explanation of this appeared to be that in the exceptionally dilute solution the liberated bromine hydrolyzed to form bromic and hydrobromic acids according to the equation:

$$3Br_2 + 3H_2O = HBrO_3 + 5HBr$$

This being the case, such reaction would have continued until a sufficient concentration of hydrogen ions was obtained to suppress the hydrolysis. * * * Careful laboratory research, involving potentiometric titration of natural sea water, showed that reabsorption of free bromine by hydrolysis ceased if the hydrogen-ion concentration were increased to a pH of 3 to 4 by the addition of acid from an outside source. This indicated, therefore, that in order to liberate bromine in sea water completely and efficiently, it would be necessary first to add sufficient acid to give a pH of approximately 3.5."

As above indicated, the Dow method of recovery of the liberated bromine involves the reaction of the liberated bromine with sodium carbonate to form sodium bromide and sodium bromate, according to the formula:

$$3Na_2CO_3 + 3Br_2 = 5NaBr + NaBrO_3 + 3CO_2$$

In practice the air and bromine are passed through the sodium carbonate solution in an absorption tower and later the bromine is liberated from the solution by acidifying with sulphuric acid.

Curtin et al., United States Patent No. 1,916,094, suggest an alternate method of recovering the bromine which is liberated by one of the methods above indicated, by the use of so-called cracked gasoline and preferably the fraction boiling below 240° C. Curtin et al. indicate that the bromine compound formed is a dibromide which, together with the gasoline radical, forms a water insoluble compound which may be separated from the brine and the bromine extracted therefrom. The general formula of the Curtin et al. extraction compound is brominated hydrocarbon made up of carbon, hydrogen and bromine. In order to form this compound, it is essential as in the previous instances, to liberate the bromine in elemental form which can occur only in an acid brine and in addition, it is desirable to use an excess of chlorine in the brine under treatment so that any bromine released as hydrobromic acid resulting from a substitution reaction is oxidized by the excess chlorine to reliberate bromine for reaction with the hydrocarbon liquid.

It will therefore be understood in view of the above, that prior methods of extraction of bromine from brine all have required the step of first acidulating the brine before the bromide ion is oxidized. Where elemental bromine is actually removed from the brine by blowing out, as in the Dow process, the brine must be acidic in order to get the elemental bromine out without the same going to an oxidized bromate form. In the previous methods of recovery involving the reaction of the elemental bromine, as for example, the processes used by the Ethyl Gasoline Corporation and suggested by Curtin et al., the brine must be acidic in order to allow the bromine to exist in elemental form in order to react with the extraction compound, as in any of these cases the compound is not reactive with the bromide ion.

The process of the present invention has been particularly developed for extracting bromine from natural brines without requiring the acidulation of the brine. As will be understood, most natural brines, such as sea-water, and lake and marsh brines, as well as brines prepared from salt beds and those concentrated in the form of bittern, mother-liquor, etc. are alkaline. Ordinary sea-water has a pH of approximately 7.2 to 8, and other brines are frequently more alkaline. Certain brines have a much higher bromine content than sea-water but no successful commercial method has been devised for the extraction of the bromine, due to the high alkalinity of the brine. For example, the brine form Searles Lake, a salt-marsh in the northwestern part of San Bernardino County, California, has a bromine content of approximately one thousand parts per million of brine. On the other hand, however, the brine from Searles Lake has a high alkalinity and contains a large excess of sodium carbonate, bicarbonate and borate over the bromine content. As a result, the cost of acidifying the brine to extract the bromine is far greater than the value of the bromine which may be extracted, notwithstanding the relatively high bromine content of the brine. It is also less feasible to attempt to acidulate with chlorine for the reason that the cost of the required quantity of chlorine to acidulate would again far exeed the value of the bromine which could be extracted, and further, the chlorine could not be added sufficiently fast under any of the present used methods of introduction to acidulate the brine before the bromide ion is oxidized to bromate. The only commercial method heretofore used for extracting the bromine from a brine of this type is by evaporation and crystallizing out sodium bromide, and such a process is only commercially feasible where the sodium bromide is extracted as a by-product such as of an industry producing potash, borax and allied chemicals.

We have found, however, that the bromine may be extracted from an alkaline brine by adding an oxidizing agent to the brine in an amount less than in excess relative to the bromine, so as to retain the brine alkaline and to thereby oxidize the bromide ion to form a bromide which may be reacted with a bromine-reactive compound in the alkaline brine. The importance of keeping the brine alkaline is to provide a condition wherein the oxidized bromide, even in the form of bromate, will react with a bromine-reactive organic compound.

Under proper conditions bromate will react with an organic compound such as cracked gasoline in a natural alkaline brine, whereas such a reaction will not take place in a brine acidulated to a pH of approximately 4, and as provided by the processes heretofore used. For example, we prepared 50 ml. of Searles Lake brine with an excess of chlorine and then agitated with 10 ml. of cracked gasoline for periods ranging from two and one-half to fifteen minutes, and obtained an extraction of bromine ranging from nothing to less than 10%. Where the proportion of cracked gasoline to the brine was reduced to about one part in five hundred, as indicated by Curtin et al., the extraction could not be detected. However, we have found that by treating the natural brine with an oxidizing agent such as chlorine or preferably sodium hypochlorite, in an amount less than an excess in order to retain the alkalinity of the brine, that the bromine could be extracted from the bromate with a large number of organic compounds including cracked gasoline. For example, we added to 50 ml. of Searles Lake brine, 6 ml. of 5% sodium hypochlorite which is sufficient to change all of the bromide ion to bromate without substantially affecting the alkalinity of the brine, and then agitated 5 ml. of the same cracked gasoline as above with the brine for a period of five minutes, and obtained approximately 92% extraction of the bromine. One explanation for the above is that in acidifying the Searles Lake brine with an excess of chlorine, the delay in acidifying to the point where bromine ceases to hydrolize, enables the bromide ion to go to bromate and in addition, there is formed a large excess of hypochlorite plus a smaller quantity of hypochlorous acid. As a result, when the bromine-reactive compound is added to the brine, the hypochlorite is more reactive than the bromate, due to the acidity, and the bromate does not enter to an appreciable extent into the reaction. This condition has been explained in a published method of determination of bromine by Kilthoff & Yutzy, I. E. Chem. Anal. Ed. 9, 75 (1937) and others. This method involves the reaction of hypochlorous acid with sodium formate in solution stable to sodium dihydrogen phosphate, whereas bromate in such solution does not react even at boiling temperatures.

However, in accordance with our findings, the bromate will react with the bromine-reactive compound in an alkaline solution more rapidly than will the hypochlorite. Thus, where a hypochlorite was added to the brine in amount more than sufficient to oxidize the bromide to bromate but not in a manner to change the alkalinity of the brine, we were able to recover approximately 92% of the bromine by agitating the brine with cracked gasoline. However, preferably only sufficient hypochlorite is used to change the bromide to bromate and hence little or no hypochlorite need be present to interfere with the reaction, although as aforesaid, the presence of the hypochlorite so long as the brine remains alkaline, is not a serious factor. On the other hand, sufficient hypochlorite or other oxidizing reagent must be used to change the bromide ion to bromate, since the bromide in itself is not reactive with the organic compounds herein used. The product formed by the reaction of the bromine-reactive organic compound and the bromate is of the general formula RBrX where R is the radical of the organic compound and X is the radical of a class containing chlorine or oxygen, which elements are more difficult to oxidize than is bromine as they occur in the brine and which are therefore capable of holding bromine in an electro-positive valence state. The chlorine or oxygen will react with the bromine to form this compound rather than the forming of a dibromo compound for the reason that these elements are also combined with the bromine and must exercise their oxidizing equivalents on whatever compound may be present and which may be so oxidized. We have thus found that the bromine may be extracted from an alkaline brine by the formation of the aforesaid compound RBrX, and which to our knowledge has never been heretofore used in the art for extracting bromine.

While the above outlined process is commercially feasible in extracting bromine from alkaline brines and forms an important part of the present invention, we have developed a procedure modified from the above which is preferred from the standpoint of efficiency and greater effectiveness and speed in removing the bromine. This preferred form of the process involves briefly the bringing about of a substantially simultaneous reaction of the bromide ion and the oxidizing reagent, and a bromine-reactive organic compound to form a halogenated compound which is substantially insoluble in the brine and having the same general formula as above noted, viz. RBrX. This simultaneous reaction of the bromide ion and oxidizing reagent and the organic compound, is preferably brought about by oxidizing the bromide ion in the presence of the organic compound. To this end the organic compound is first intimately mixed with the brine by thorough agitation, and then the oxidizing reagent added in order to have the organic compound immediately available for reaction at the instant the oxidizing reagent is associated with the bromide ion. In this way a substantially immediate reaction takes place in which the bromine and X radicals of the compound react with the radical R before the bromide ion is allowed to oxidize completely to bromate.

In the preferred form of the invention we use sodium hypochlorite, NaClO, as the oxidizing reagent and when this ingredient is used the general formula of the final bromine compound or at least a substantial portion thereof is RBrCl. One explanation for the success of this reaction is to assume the existence of bromine chloride for a short instant at least after the addition of the hypochlorite, but for a sufficient time to react with the organic compound if the same is then present. Any delay in the reaction of the bromine chloride with the organic compound will incur, in an alkaline solution, the hydrolysis of the bromine chloride to form hypobromite and the subsequent oxidizing of the same to bromate. Bromine chloride was postulated by early experimenters as chemically possible from an academic point of view and more recently the compound has been shown to exist, for example see Vesper & Rollefson, J. A. C. S. 56, 620 (1934), who determined the equilibrium constant for the reaction $$Cl_2 + Br_2 = 2ClBr, K = 0.107 \pm 0.002$$

Delepine & Ville Bull. Soc. Chim. 27, 673 (1920); Compt. rend. 170, 1390 (1920); C. A. 14, 3405 (1920) and others, for example, see C. A. 30, 4744-2 (1936), have described the formation of bromine chloride in acid solutions and in organic solvents as well as in vapor form and have described certain of its properties, including its stability at relatively high temperatures. However, no one has apparently heretofore made a study of the characteristics of bromine chloride in alkaline solutions. We have, however, we believe, demonstrated its presence and reactivity in accordance with the above by various experiments. In one of such experiments, two gallons of Searles Lake brine were agitated with one pint of choloroform in an atmosphere of ethylene at about atmospheric pressure in a gas-tight mixer with suitable inlets, the function of the chloroform being to dissolve an appreciable amount of ethylene in the mixture. 0.56 qt. 5% NaClO solution was added during four minutes mixing. This quantity of hypochlorite was known to be a definite excess. On stopping the agitation the brine was found to contain approximately 0.085 gram per litre bromine, whereas the original brine contained approximately 1.003 grams per litre bromine, indicating a removal of approximately 91% of the bromine. The chloroform was distilled and a component was found which distilled between 105° and 107° C., which is the boiling point of ethylene chlorobromide, ClCH₂CH₂Br. A quantity of bromoform, CHBr₃, was found as well as a heavy tarry residue. Schmidt in abstracting Delephine & Ville, supra, states, "If it is supposed that BrCl is a compd. which dissociates to such an extent that it escapes phys. methods, it must be admitted that the minute unassociated portion reacts much more rapidly with C₂H₄ than either of its constituents. The supposition that C₂H₄ combines first with Br, and that Cl later displaces part of the Br in C₂H₄Br₂, is not in accord with the facts, as this reaction does not take place."

Hence, in the present process, the formation of ethylene chlorobromide as described, indicates the prior formation of bromine chloride and the formation of this latter compound is apparently an important step in the successful carrying out of the preferred form of our present process.

In order to bring about the environment described above, that is an intimate association of the brine and bromine-reactive organic compound at the instant the oxidizing reagent is added, we prefer to use an organic compound which is either soluble in the brine but which forms an insoluble bromine compound or where the organic compound is insoluble or only sparingly soluble to produce an emulsion to which the oxidizing reagent is added. Preferably, the emulsion is of an unstable type which is maintained by agitation during the reaction, and which breaks on standing to facilitate separation of the bromine compound and extraction of the bromine therefrom.

Also, since it is highly desirable to have the organic compound present and immediately available for reaction at the instant the oxidizing reagent is added, we prefer an emulsion of the oil-in-brine type so that the oxidizing reagent will contact the brine phase of the emulsion and at the same time, the organic compound will be present and available for reaction. Where the emulsion is inverted, that is, the brine-in-oil type, the oxidizing reagent which in most instances is insoluble in the oil phase, is held separated from the brine by the intervening oil phase and hence there is little opportunity for reaction. For example, 50 ml. Searles Lake brine was agitated with 12.5 ml. "propane precipitated resins" from the Union Oil Company's solvent refining process for lubricating oil, plus 12.5 ml. carbon tetrachloride. This formed a brine-in-oil type of emulsion. Then 3.5 ml. 5% sodium hypochlorite solution was added during two minutes of agitation. The brine separated with some difficulty and was found to contain approximately 0.742 gram per litre bromine, whereas the original brine contained approximately 0.900 gram per litre bromine. This represents a recovery of only about approximately 17½% of the bromine. On the other hand, when 150 ml. brine was agitated with a substantially less proportion of the same "propane precipitated resins," to-wit: 6.5 ml., and 12.5 ml. carbon tetrachloride added, an oil-in-brine emulsion was formed, to which 10.5 ml. of the same hypochlorite was added during two minutes of agitation, the emulsion separated quickly and the brine contained only about 0.053 gram per litre bromine, representing a recovery of approximately 94%.

When we omitted the "propane precipitated resins" from the experiment just cited, there was no appreciable extraction of the bromine by the carbon tetrachloride. The function of the latter in the experiment is to make the organic phase more fluid, as the "propane precipitated resins" were almost solid, and would not emulsify without the solvent. The use of a solvent for placing such solid or semi-solid bromine-reactive organic compounds in a fluid state for emulsifying with the brine, forms one of the important features of the present invention. Similarly, in the ethylene experiment described in the foregoing, we made several runs, omitting the solvent, chloroform, with erratic results. In the case of ethylene and other gaseous organic compounds which we may use in carrying out the present process, the question of fluidity is not involved but the problem is to obtain sufficient of the bromine reactive organic compound in the brine. In the case of ethylene, chloroform is a better solvent for the ethylene than is the brine, and by dissolving the ethylene increases the transfer of this reagent to the brine. Other solvents may be used for the purpose cited which are essentially inert as bromine extractments, such as refined kerosene and lubricating oils and the like. However, many of the bromine-reactive compounds which we may use for extracting the bromine may be used as solvents for other bromine-reactive compounds and are in many instances preferred.

In practicing the preferred form of the invention, the principal bromine compound extracted is of the general formula RBrCl. However, it is not possible in all instances to completely react the bromine chloride with the bromine-reactive organic compound R before the bromine chloride hydrolyzes to form BrO$^-$ and is then further oxidized to BrO$_2^-$ and finally to BrO$_3^-$. As has been pointed out in connection with the first process, the bromine reactive organic compound R may react with the bromate or with either of the lesser oxidized forms BrO$^-$ or BrO$_2^-$. The overall reaction may be indicated approximately as follows:

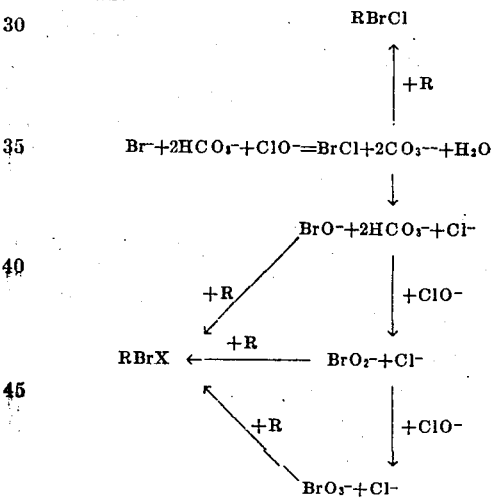

As will be seen from the above layout, the reaction may proceed up from the initial formation of the BrCl to form RBrCl, or if the RBrCl is slower to form than the hydrolysis of the BrCl, then the reaction will proceed downwardly as indicated above, to form BrO$^-$ or further to form BrO$_2^-$ or lastly, to form BrO$_3^-$. At any stage of the lower reaction the bromine reactive organic compound may react with the hydrolyzed BrCl to form a bromine compound of the general formula RBrX.

The above equation may be controlled by adding the hypochlorite, ClO$^-$, sufficiently slow and providing a thorough agitation of the organic compound R in the brine so that the same will be available for reaction immediately upon forming the BrCl and by selecting an organic compound R which reacts at relatively good speed with the BrCl. In most instances the reaction:

$$BrCl + R = RBrCl$$

proceeds faster than does the reaction:

$$BrCl + 2CO_3^{--} + H_2O = BrO^- + 2HCO_3^- + Cl^-$$

The further oxidation of BrO$^-$ to BrO$_2^-$ and BrO$_3^-$ proceeds faster than does the reaction forming the BrO−. By reason of these different speeds of reactions, conditions and ingredients may be selected so as to cause the reaction to move across and upwardly in the above layout to form a majority of RBrCl.

Due to the fact that the formation of the BrCl is rapid, as is also the reaction of the BrCl plus R to form RBrCl, the total time of mixing of the reagents in the preferred form of the invention may be substantially reduced from that required where the slower reaction involving the $BrO_3$ is involved. In most instances the formation of the RBrCl may be effected within the time taken to add the hypochlorite, about a fraction of a minute. On the other hand, where the first indicated procedure is used, that is involving the reaction of the organic compound R and the hydrolyzed and oxidized BrCl, we prefer to agitate the organic compound with the brine for several minutes in order to effect the complete reaction of R with BrO−, $BrO_2^-$ or $BrO_3^-$.

The compounds R, hereinabove referred to, consist of a relatively large number of bromine reactive organic compounds. This group of bromine reactive organic compounds are for the most part either unsaturated or partially oxidized and may be roughly grouped into two major classes including saturated and unsaturated compounds. The saturated compounds react with the bromine by substitution, wherein generally a hydrogen is replaced by bromine. The hydrogen which is split off must combine with either the oxygen of the bromate or else with the chlorine of the bromine chloride to form either water or hydrochloric acid which dissolves in the brine. In a compound such as diacetone, one of the products formed is bromoform and in addition carbon dioxide is formed. In this case the oxidation actually ruptures the molecule of diacetone, forming several molecules. This rupturing or breaking down will eventually take place with any of these compounds, saturated or unsaturated, most particularly when they are regenerated, as hereinafter explained.

The class of saturated compounds may be divided into several operable sub-classes, including acids, amines, aldehydes and alcohols. Of the acid group we have found for example, that oleic acid, naphthenic acid and sulphonated oleic acid have been used successfully to extract the bromine. In the case of amines, cyclohexylamine and triamylamine give very good extraction. In the case of aldehydes, butyraldehyde and crotonaldehyde give appreciable extraction. In the case of ketones, diacetone and mesityloxide give very good extraction. In the case of alcohols, butyl and cyclohexyl alcohols give good extraction. Some of the compounds above mentioned also contain unsaturated chains which cause them to operate in part as compounds in the unsaturated group. The saturated compounds as a class are being more fully developed and claimed in a divisional application.

The unsaturated compounds of the organic class appear to be substantially completely operable and provide a definite class which may be used with either of the processes above outlined. This class of compounds may be divided into sub-classes, including petroleum oils and derivatives, animal and vegetable oils and derivatives, and synthetic or manufactured unsaturated organic compounds. As indicated by the class, the individual members of the class are operative substantially in accordance with the degree of unsaturation. In the case of petroleum oils the more unrefined and crude petroleum oils are far more effective in extracting the bromine than the refined petroleum oils which have had the unsaturated compounds removed. The same is also true of the compounds derived from the animal and vegetable oil class and the manufactured or synthetic class.

The following experiments serve to confirm the above: In each case, the brine selected was from Searles Lake and was agitated with the organic compound in a high speed mixer in a small jar. Hypochlorite was added during one and one-half to three minutes, after which the emulsion was allowed to settle and the brine analyzed to determine the bromine content remaining. Various samples of brine used in the experiments contained between 0.900 and 1.05 grams per litre (G. P. L.), bromine.

50 ml. brine mixed with 12.5 ml. crude petroleum, and 3.5 ml. 5% NaClO added. There remained 0.027 G. P. L. bromine, representing a recovery of over 96%.

50 ml. was mixed with 12.5 ml. raw vacuum distillate + 12.5 ml. $CCl_4$ and 3.5 ml. 5% NaClO solution added. There remained 0.085 G. P. L. bromine in the brine.

50 ml. brine was mixed with 6.5 ml. propane precipitated waxes + 6.5 ml. $CCl_4$ and 3.5 ml. 5% NaClO solution added. There remained 0.066 G. P. L. bromine in the brine.

50 ml. brine was mixed with 12.5 ml. wax free filtrate and 3.5 ml. 5% NaClO solution added. There remained 0.037 G. P. L. bromine in the brine.

50 ml. brine was mixed with 6.5 ml. solvent extract and 3.5 ml. 5% NaClO solution added. There remained 0.032 G. P. L. bromine in the brine.

50 ml. brine was mixed with 12.5 ml. solvent raffinate and 3.5 ml. 5% NaClO solution added. There remained 0.851 G. P. L. bromine in the brine.

50 ml. brine was mixed with 12.5 ml. finished "Triton" oil and 3.5 ml. 5% NaClO solution added. There remained 0.838 G. P. L. bromine in the brine.

These samples, as well as the propane precipitated resins hereinbefore mentioned, were taken from the Union Company's "propane solvent process" for refining lubricating oil. The solvent raffinate and finished "Triton" oil have had as much as possible of the unsaturated compounds removed and consequently are poor bromine removers.

Unsaturated petroleum samples of the Shell Oil Company reacted as follows:

50 ml. brine was mixed with 10 ml. UF–1 medium fuel oil + 5 ml. kerosene and 3.5 ml. 5% NaClO solution added. There remained 0.053 G. P. L. bromine in the brine.

50 ml. brine was mixed with 10 ml. UF–33 heavy fuel oil and 3.5 ml. 5% NaClO solution added. There remained 0.043 G. P. L. bromine in the brine.

50 ml. brine was mixed with 5 ml. P. B. F. crude residuum + 10 ml. kerosene and 3.5 ml. 5% NaClO solution added. There remained 0.048 G. P. L. bromine in the brine.

50 ml. brine was mixed with 10 ml. cracked gasoline + 3.5 ml. 5% NaClO solution added. There remained 0.038 G. P. L. bromine in the brine.

The following series of fatty oils illustrate how the reactivity is less as the unsaturated component is less, as indicated by the iodine value:

50 ml. brine was mixed with 12 ml. raw linseed oil (iodine value 175-202) and 3.5 ml. 5% NaClO solution added. There remained 0.044 G. P. L. bromine in the brine.

50 ml. brine was mixed with 6 ml. air blown soja bean oil (iodine value 122-134) +6 ml. kerosene and 3.5 ml. 5% NaClO solution added. There remained 0.133 G. P. L. bromine in the brine.

50 ml. brine was mixed with 12 ml. cotton seed oil U. S. P. (iodine value 103-111.3) and 3.5 ml. 5% NaClO solution added. There remained 0.144 G. P. L. bromine in the brine.

50 ml. brine was mixed with 10 ml. neat's-foot oil (iodine value 57.5-75) and 3.5 ml. 5% NaClO solution added. There remained 0.355 G. P. L. bromine in the brine.

50 ml. brine was mixed with 5 ml. coconut oil (iodine value 6.2-10) +10 ml. kerosene, and 3.5 ml. 5% NaClO solution added. There remained 0.502 bromine in the brine.

Other unsaturated organic products which extract bromine react as follows:

50 ml. brine was mixed with 10 ml. low melting soja fatty acids and 3.5 ml. 5% NaClO solution added. There remained 0.039 G. P. L. bromine in the brine.

50 ml. brine was mixed with 6 ml. blown rape seed oil+6 ml. kerosene and 3.5 ml. 5% NaClO solution added. There remained 0.088 G. P. L. bromine in the brine.

50 ml. brine was mixed with 12 ml. oleic acid and 3.5 ml. 5% NaClO solution added. There remained 0.011 G. P. L. bromine in the brine.

50 ml. brine was mixed with 10 ml. coconut fatty acids and 3.5 ml. 5% NaClO solution added. There remained 0.197 G. P. L. bromine in the brine.

50 ml. brine was mixed with 5 ml. sulphonated oleic acid and 3.5 ml. 5% NaClO solution added. There remained 0.067 G. P. L. bromine in the brine.

50 ml. brine was mixed with 10 ml. filtered sardine oil and 3.5 ml. 5% NaClO solution added. There remained 0.059 G. P. L. bromine in the brine.

50 ml. brine was mixed with 2 grams soft vegetable pitch+10 ml. kerosene, and 3.5 ml. 5% NaClO solution added. There remained 0.117 G. P. L. bromine in the brine.

50 ml. brine was mixed with 10 ml. turpentine and 3.5 ml. 5% NaClO solution added. There remained 0.061 G. P. L. bromine in the brine.

50 ml. brine was mixed with 2 ml. naphthenic acids kerosene fraction, and 3.5 ml. 5% NaClO solution added. There remained 0.095 G. P. L. bromine in the brine.

50 ml. brine was mixed with 0.5 ml. coal tar dissolved in 10 ml. xylol and 5 ml. 5% NaClO solution added. There remained 0.067 G. P. L. bromine in the brine.

The percentage of extraction of the bromine from the brine does not vary materially in the use of either of the processes outlined above, that is, in one case where the organic compound is present at the time of addition of the oxidizing reagent and in the other instance, where the organic compound is added subsequent to the adding of the oxidizing reagent. For example, using cracked gasoline in the preferred process that is wherein the gasoline is present at the time the oxidizing reagent is added, the bromine extraction is approximately 96%, whereas in the other mentioned process, where the gasoline is added subsequent to the hypochlorite, the recovery is 92%. In most instances the recovery with the preferred process of the present invention is slightly better than with the alternate process, besides being considerably faster. The preferred process also uses substantially less oxidizing reagent, since the process involves the use of only two equivalents of oxidizing reagent per atom of bromine in changing the bromide ion to bromine chloride, whereas the alternate process uses six equivalents in changing the bromide ion to bromate.

In order to recover the bromine commercially, it is essential to use a bromine reactive organic compound which is both effective in removing the bromine and also inexpensive. For this reason the unsaturated group is preferred, since certain of the members in this group are both highly effective in removing the bromine and very cheap. For example, various types of petroleum crudes and various animal and vegetable oils are available on the market in large quantities at low prices.

In addition, we have found that the organic compound may be regenerated after removal of the bromine therefrom, so as to enable a re-use of the compound in the bromine extracting cycle. In many instances the regenerated compound is more reactive than the original compound. In the case of the compounds in the saturated group, many of these compounds when properly regenerated, become unsaturated compounds and their effectiveness thereby increases. Preferably, the regeneration of the compound is effected simultaneously with the extraction of the bromine from the compound. This may be done by heating the compound either alone or in the presence of caustic soda at temperatures ranging from approximately 150° to 250° C., for periods up to approximately two and one-half hours, depending upon the compound used. In some instances an additional catalyst may be used. As an example of the function of the regeneration in increasing the reactivity of the compound, we treated a quantity of spray oil extract with bromide and hypochlorite until it became almost non-reactive. It was then heated with caustic soda at 175° to 250° C., for two and one-half hours to remove the bromine. 12½ ml. of the regenerated oil was then mixed with 50 ml. of brine and 3.5 ml. 5% NaClO solution added and the oil extracted 84% of the bromine, whereas the original oil in a similar experiment extracted 73½%. In this manner, the compound may be used to extract the bromine and then be regenerated and re-used through a series of cycles until the compound is consumed.

The final bromine product obtained from the present process depends upon the particular bromine compound desired. When the bromine-reactive organic compound is heated, bromine splits off in the form of hydrogen bromide. the hydrogen being taken from the organic radical. The hydrogen bromide may be dissolved in water to form hydrobromic acid or combined with alkali to form a salt which is a commercial product. Also, in some instances the final product of the general formula RBrCl or RBrX may have commercial value and may form the end product of such system. In such case, the regeneration step is not employed.

The practice of the present invention will be clear from the foregoing and may be carried out with various types of apparatus. We prefer to use an apparatus which will afford a continuous cycle in order to realize a high operating efficiency. Such apparatus are diagrammatically represented in Figures 1 and 2 of the drawing. The apparatus illustrated in Figure 1 has been particularly devised for use with a gaseous unsaturated compound such as ethylene, where the same is dissolved by a suitable solvent, as above explained. The apparatus illustrated in Figure 2 is particularly arranged for use with a liquid bromine-reactive organic compound.

The operation of the apparatus illustrated in Figure 1, using ethylene as the extracting compound is as follows: The ethylene and solvent are added to a mixer or agitator 1, together with the brine and a suitable oxidizing reagent such as hypochlorite. The hypochlorite is added at the rate not faster than will combine with the ethylene as the same is dissolved by agitation. The mixer may consist of any suitable container with a power driven agitator to ensure a thorough emulsification of the products. The emulsified products are passed from the mixer to a settler 2, where the emulsion breaks and the water and oil phases separate. The solvent and ethylene are returned to the mixer 1, while the excess ethylene chlorobromide is removed and ethylene is added as the same is used. In the case of a gaseous reagent such as ethylene, the reaction with the bromine chloride converts the same into a liquid, which provides a solvent for other ethylene added to the system. The ethylene is preferably maintained in excess over that which dissolves in the brine and solvent and over that which reacts with the bromine chloride, which excess separates out of the brine in the settler and is returned in gaseous form to the mixer. The ethylene and ethylene chlorobromide while substantially insoluble in the brine, will remain in small quantities in the brine and for this reason the brine is preferably passed from the settler to a stripper 3, which may consist of an agitator and settler in which the brine is agitated with a product such as kerosene or other petroleum or other oil, which is insoluble in the brine but which dissolves or absorbs ethylene and the bromine compound. Preferably, the absorbing product is a liquid having a boiling point different from that of the ethylene and the bromine products formed in the mixer 1, so that the latter can be readily separated by distillation. When the stripping product has accumulated considerable ethylene or bromine compound, the same is passed to a still 4, where the ethylene and bromine compound may be removed and the stripping liquid returned to the stripper. The brine, cleansed of the ethylene and bromine compound in the stripper, is discharged from the system.

In the apparatus illustrated in Figure 2, the brine and liquid bromine-reactive oil and oxidizing reagent as hypochlorite are added to a mixer 5 similar to the mixer 1 above, except that the same need not be gas-tight as is preferable in the apparatus illustrated in Figure 1. The hypochlorite is preferably added at a rate not faster than will cause the bromide to combine with the oil. The emulsified products are passed from the mixer to a settler 6 similar to that used in the apparatus illustrated in Figure 1, where the emulsion is allowed to separate. The brine separating out of the emulsion is discharged from the settler and out of the system. The oil separating out of the emulsion is re-circulated until reacted to a desired degree of saturation, when the same may be removed from the system, or, as here shown, passed to a retort 7 for regeneration of the oil and extraction of the bromine as above explained. As here indicated, caustic soda is passed into the retort and crude sodium bromide removed. Preferably the retort is connected in parallel with the reactive oil circuit, so that a definite part of the oil circulating will be passed to the retort. Fresh oil is added to the circuit at the mixer.

Any of the units of the apparatus described above may be made in multiple or cascade in order to obtain more efficient operation. The various circuits indicated may be maintained by the use of pumps or other pressure means and also appropriate control valves may be used.

While the process of the present invention has been particularly described in the above with relation to bromine, the process and compounds will also effect an extraction of iodine. The analytical method used in determining the bromine content of the brine before and after treatment by the present invention, and as described in full by Kolthoff & Yutzy, supra, does not distinguish between the bromine and iodine and hence the bromine content indicated in the foregoing in each instance represents the combined content of bromine and iodine expressed as bromine and the bromine equivalent of iodine. The iodine extraction per se may, however, be conclusively shown by the use of electrometric titration method of determination of iodine content. For example, we fortified one litre of brine with potassium iodide until the electrometric titration curve showed two inflection points corresponding to 0.225 G. P. L. iodine. 100 ml. of this brine was agitated with 10 ml. cracked gasoline plus 10 ml. medium fuel oil, and 5 ml. 5% NaClO solution was added. In testing the brine after separating out the organic compound, the electrometric titration curve showed no inflection at the potentials corresponding to iodine.

We have also found that the iodine is removed with the very first amount of bromine extracted, and by proper control of the addition of the oxidizing reagent, it is possible to remove substantially all of the iodine with only a very small part, if any, of the bromine. Where, therefore, it is desired to isolate the iodine extracted from the bromine extracted, we prefer to use a multi-stage apparatus wherein the iodine is extracted in the first stage and the bromine extracted in the later stage or stages. As an example of the removal of the iodine with the first bromine extracted, the brine remaining after being treated as above to remove the iodine, was analyzed for bromine and we found that 0.610 G. P. L. bromine remained in the brine, indicating a majority of the original bromine content.

As will be understood from the foregoing, the present process may be distinguished from the former processes hereinbefore referred to in that the bromine in the present process is chemically combined with a bromine-reactive compound after the bromine has been oxidized to an electro-positive valence state, whereas in the former processes described, the bromine has been combined in its elemental form or zero valence state. The terms "electro-positive valence state" and "electro-positive bromine" as used herein define that character or state of the bromine after oxidation from an electro-negative ionic form to an electro-positive valence form, as mentioned herein in combination with chlorine or oxygen and as found in the forms of bromine chloride and bromate ion.

We claim:

1. The process of extracting bromine from a natural alkaline brine stable with respect to bicarbonate ion which consists in oxidizing the bromide ion in the natural brine by means of a chlorine reagent and to a positive valent state in combined form with an element of the group consisting of chlorine and oxygen, and reacting the same with an organic bromine reactive compound to form a bromine compound of the general formula RBrX where R is the radical of said first compound and X is a radical of the class of elements including chlorine and oxygen, said process being carried out in a brine solution having an alkalinity at all times stable to bicarbonate ion.

2. The process of extracting bromine from an alkaline brine which consists in oxidizing the bromide ion in the brine to a positive valent state in combined form with an element of the group consisting of chlorine and oxygen, said oxidizing step being carried out while retaining the alkalinity of the brine stable to bicarbonate ion, and reacting the combined form of the positive valent bromine with an unsaturated organic compound of the class consisting of fluids, fats, waxes and bitumens derived from petroleum oil, animal and vegetable oils and synthetic organic compounds.

3. The process of extracting bromine from an alkaline brine which consists in oxidizing the bromide ion in the brine to a positive valent state in combined form with an element of the group consisting of chlorine and oxygen, said oxidizing step being carried out while retaining the alkalinity of the brine stable to bicarbonate ion, and reacting the combined form of the positive valent bromine with unsaturated petroleum oil.

4. The process of extracting bromine from an alkaline brine which consists in oxidizing the bromide ion in the brine to a positive valent state in combined form with an element of the group consisting of chlorine and oxygen, said oxidizing step being carried out while retaining the alkalinity of the brine stable to bicarbonate ion, and reacting the combined form of the positive valent bromine with an unsaturated organic compound of the class derived from animal and vegetable organic compounds.

5. The process of extracting bromine from an alkyline brine which consists in oxidizing the bromide ion in the brine to a positive valent state in combined form with an element of the group consisting of chlorine and oxygen, said oxidizing step being carried out while retaining the alkalinity of the brine stable to bicarbonate ion, and reacting the combined form of the positive valent bromine with an unsaturated bromine reactive fish oil.

6. The process of extracting bromine from an alkaline brine which consists in oxidizing the bromide ion in the brine to a positive valent state in combined form with an element of the group consisting of chlorine and oxygen, said oxidizing step being carried out while retaining the alkalinity of the brine stable to bicarbonate ion, and reacting the combined form of the positive valent bromine with ethylene.

7. That step in the process of recovering bromine from alkaline brine containing bromide ion which consists in oxidizing the bromide ion with hypochlorte in a brine solution stable with respect to bicarbonate ion and in the presence of ethylene to form ethylene chlorobromide as a reaction product.

FRANK F. LINDSTAEDT.
DAVID L. SHATTO.